E. SCHNEIDER.
APPARATUS FOR AIMING GUNS.
APPLICATION FILED MAR. 31, 1919.

1,334,680.

Patented Mar. 23, 1920.
9 SHEETS—SHEET 1.

E. SCHNEIDER.
APPARATUS FOR AIMING GUNS.
APPLICATION FILED MAR. 31, 1919.
1,334,680.
Patented Mar. 23, 1920.
9 SHEETS—SHEET 4.
Fig. 4.
Fig. 5.
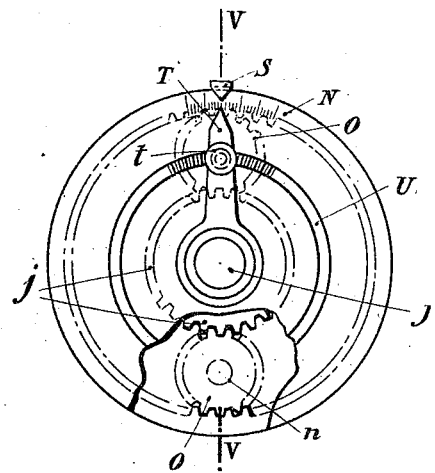
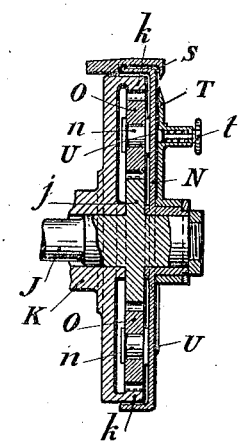
Fig. 6.
Fig. 7.
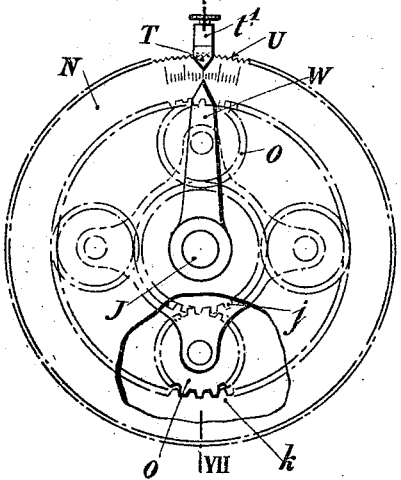
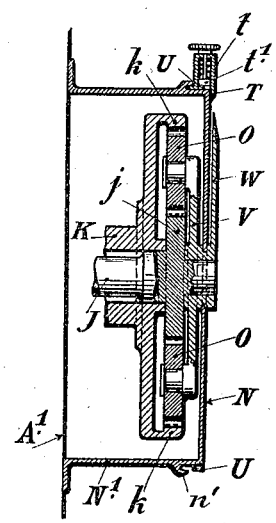

E. SCHNEIDER.
APPARATUS FOR AIMING GUNS.
APPLICATION FILED MAR. 31, 1919.

1,334,680.

Patented Mar. 23, 1920.
9 SHEETS—SHEET 5.

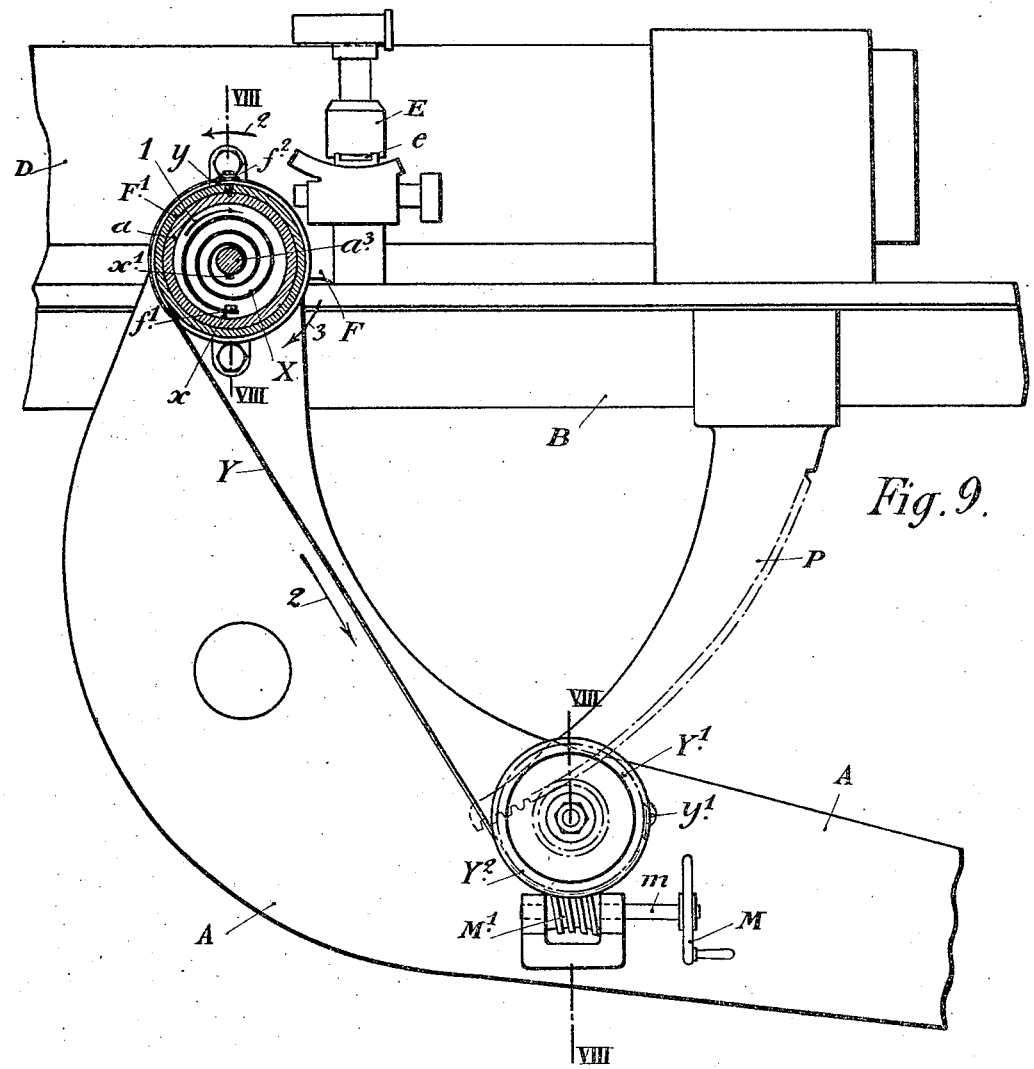

E. SCHNEIDER.
APPARATUS FOR AIMING GUNS.
APPLICATION FILED MAR. 31, 1919.

1,334,680.

Patented Mar. 23, 1920.
9 SHEETS—SHEET 7.

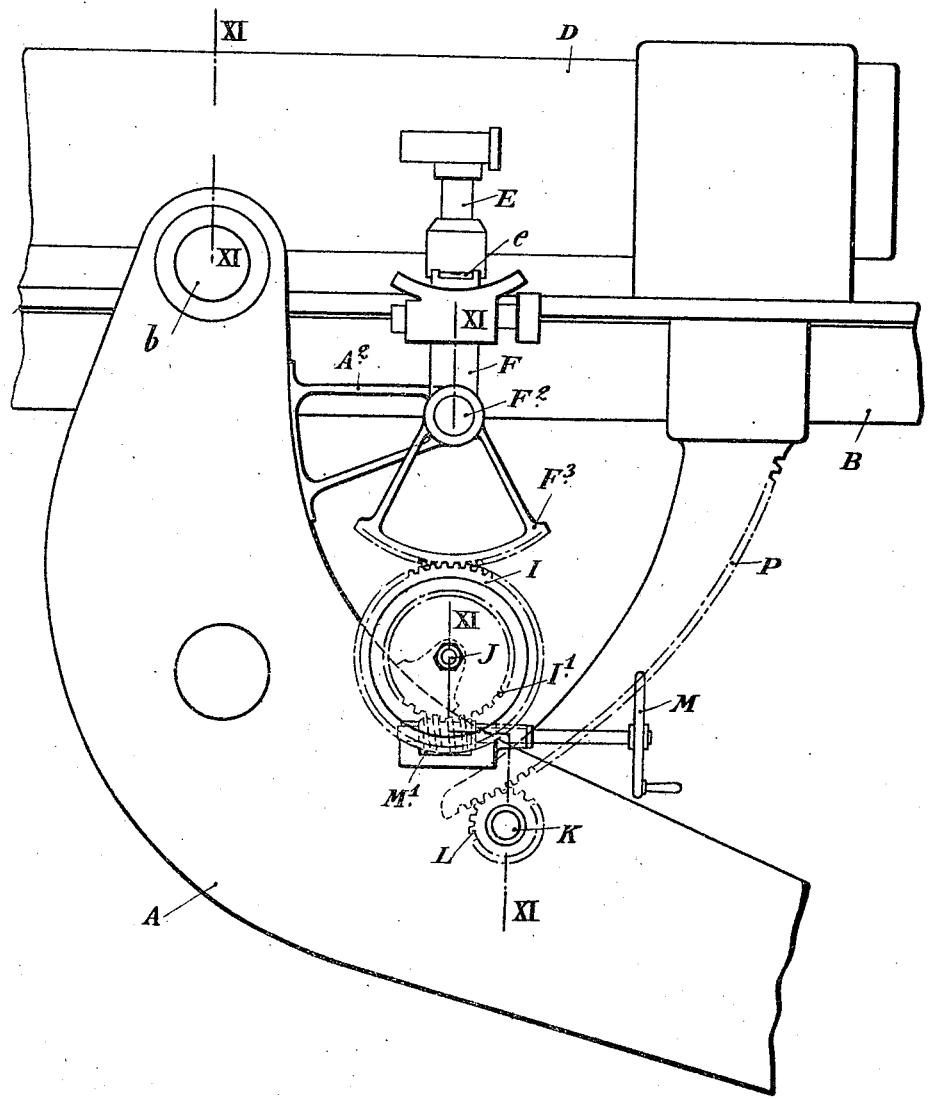

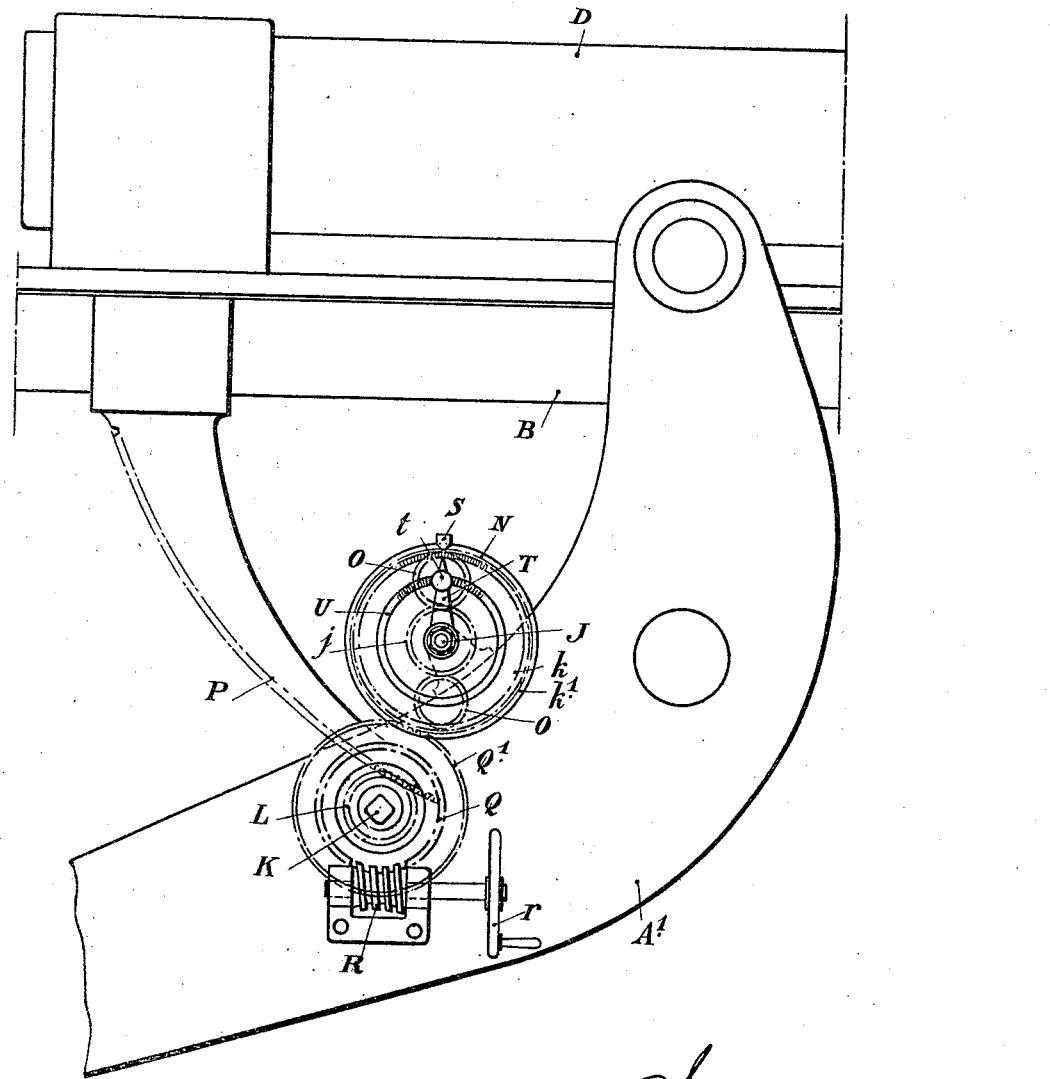

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR AIMING GUNS.

1,334,680.   Specification of Letters Patent.   Patented Mar. 23, 1920.

Application filed March 31, 1919. Serial No. 286,490.

*To all whom it may concern:*

Be it known that I, EUGÈNE SCHNEIDER, citizen of the French Republic, and resident of 42 Rue d'Anjou, Paris, France, have invented a new and useful Improved Apparatus for Aiming Guns, which invention is fully set forth in the following specification.

The known mechanisms for aiming (elevating) a gun according to an independent line of sight, comprise, as is well known, gearing for transmitting the motion for actuating the sighting apparatus operated by a (first) gun server, said gearing while shifting the said apparatus for the purpose of bringing the line of sight on to the target, moving the gun barrel through an angle that corresponds to the site of the target. The said known mechanisms comprise also gearing, operated by a second gun server, which serves to move exclusively the gun cradle and the gun barrel together as a whole. That arrangement allows of giving the elevation independently of the site, because the displacement that corresponds to the site angle will always be added algebraically to the angle that corresponds to the distance of the target, and therefore the gun barrel will finally receive by the summed operations of the two gun servers the required firing elevation.

The economy of that known mechanism lies in the independence between the gearing that serves to give the site, and the gearing that gives the elevation; the position of the sighting apparatus being never affected by the operation of the gearing that transmits the elevating motion.

One of the chief drawbacks of that arrangement is that it necessitates two gearings both of which are connected to the movements of the gun barrel. Further, the compulsory connection between the movements of the sighting apparatus and the movements of the gun barrel is permissible in practice only in the case of guns firing at targets situated on comparatively low sites, especially if it is desired to effect this connection by simple means such as pinions and toothed sectors, since the amplitude of the sectors increases necessarily in direct ratio to the possible elevation of the site.

Finally, since the actuation of the sighting apparatus entails the shifting of the gun barrel, the result is that the device from which the elevations are read off, is necessarily carried by a moving part (cradle or site sector) of the gun, which obliges the gun server to be always changing his post of observation. This drawback is especially apparent when the angles of elevation reach high values.

The improved apparatus of the present invention does away with all those drawbacks.

According to this invention the mechanism for actuating the sighting apparatus is rendered quite independent of the gun barrel, and is connected cinematically to one of the elements (graduated plate or pointer) of an apparatus for indicating the elevations, which apparatus is mounted on a stationary part of the gun.

Any change in the inclination of the sighting apparatus modifies the correct position of this element of the elevation indicating apparatus, by the value of an angle equal to the site angle. The same element of the elevation indicating apparatus is connected to the gearing for transmitting the motion for actuating the gun barrel which is operated exclusively by the elevating gun server. The firing angle (algebraic sum of the elevation and of the site) is thus given by the gun server who moves the selected scale of elevation past a pointer; the scale having been shifted through an angle corresponding to the site, by means of the sighting apparatus actuated by the other gun server.

Some constructional forms of this invention are illustrated by way of example in the accompanying drawings in which:—

Fig. 4 is an elevation of the details drawn to a larger scale of the apparatus for indicating the elevations, and of the parts connecting the said apparatus to the gearing that serves for transmitting the motion for actuating the sighting apparatus.

Fig. 5 is a section on the line V—V of Fig. 4.

Figs. 6 and 7 are respectively an elevation and a section on the line VII—VII of Fig. 6, of a modified form of the apparatus for indicating the elevations and of the parts that connect it to the gearing that serves for transmitting the motion for actuating the sighting apparatus.

Fig. 9 is a side elevation partly in section on the line IX—IX of Fig. 8.

Figs. 11, 12 and 13 illustrate a further modification in which—

Fig. 11 is a cross sectional view on the line XI—XI of Fig. 12,

Fig. 12 is a left-hand longitudinal side view of Fig. 11 and

Fig. 13 is a right-hand longitudinal side view of Fig. 11.

Figure 1:
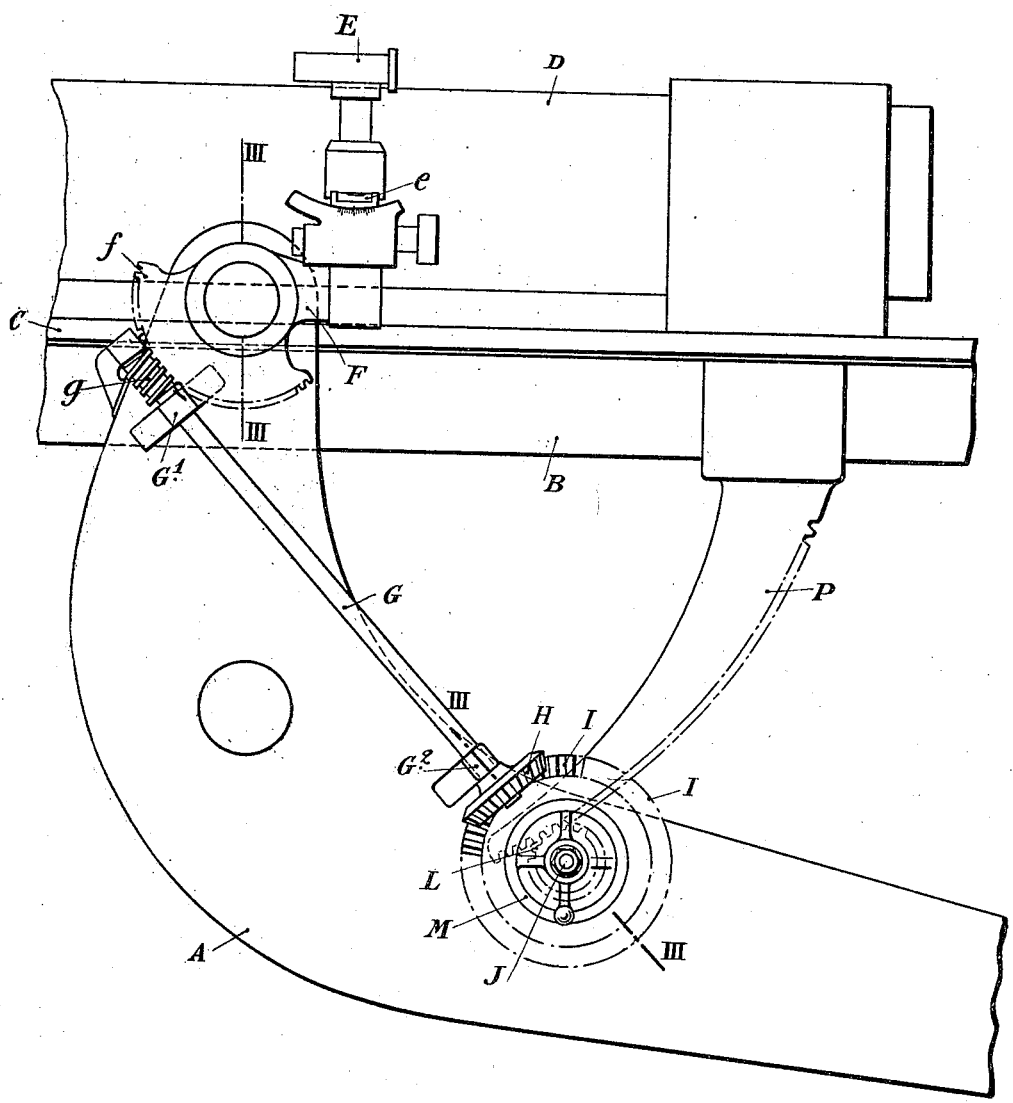
Figure 1 is a partial side elevation of a gun provided with the improved mechanism, the elevating movement being effected from the side on which the gearing is situated that serves for transmitting the motion for actuating the sighting apparatus.
Figure 2:
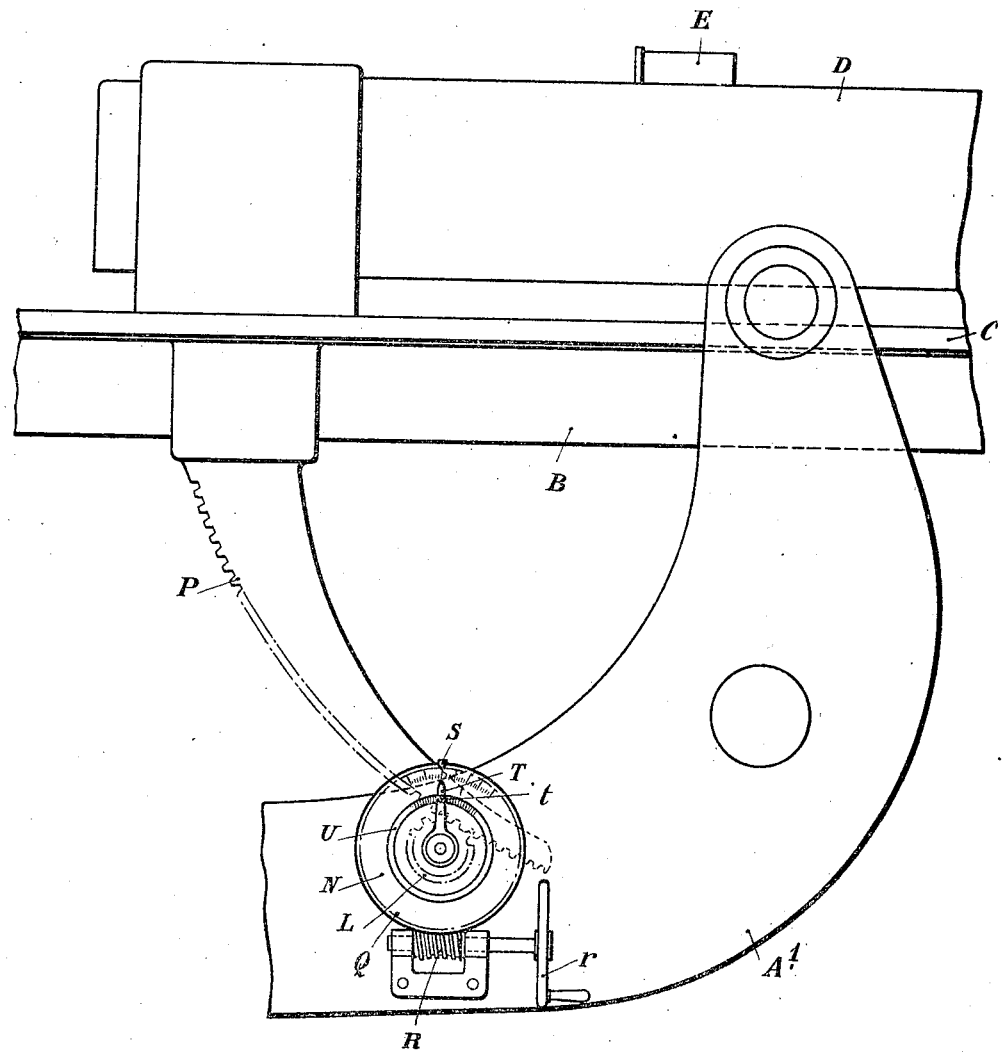
Fig. 2 is a side elevation viewed from the opposite side of the gun.
Figure 3:
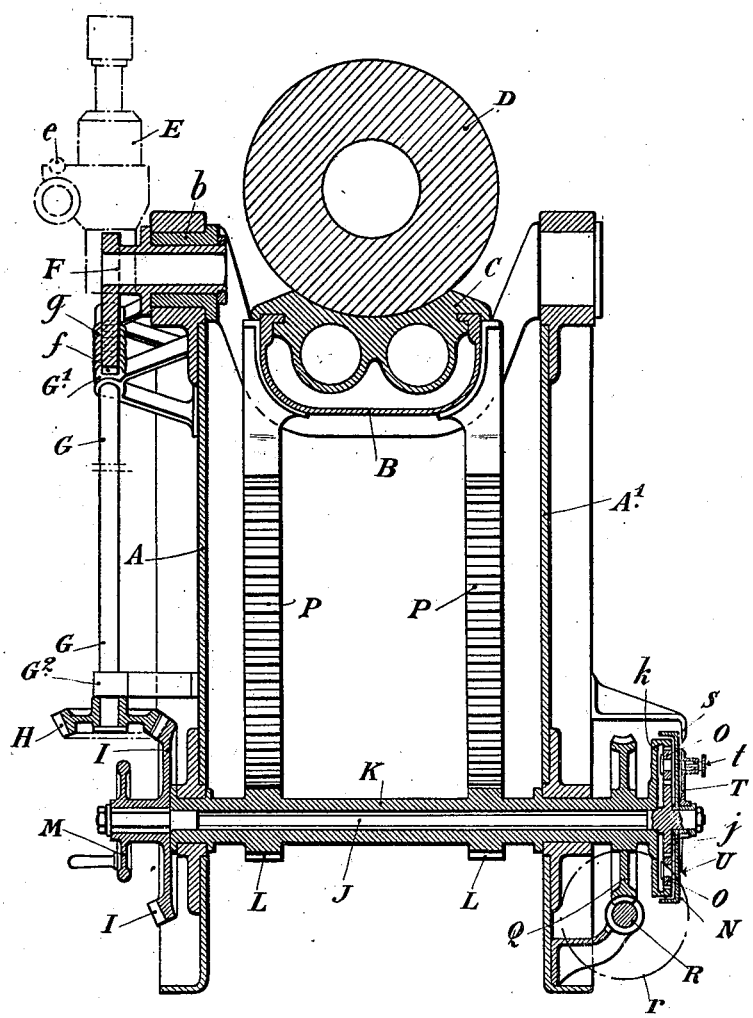
Fig. 3 is a cross section on the line III—III of Fig. 1.

In the figures, A and $A^1$ are the side plates of a gun carriage of any known type, wherein a cradle B is journaled in which in the example shown, the slide C and the gun barrel D recoil together as a whole.

The sighting apparatus E of any known type, is mounted on a support F that is capable of motion in one of the trunnions $b$ of the cradle.

An inclination varying with the site may be given to the entity F—E by means of suitable gearing which does not affect the gun barrel. This gearing may comprise for instance, a toothed sector $f$ that is fixed to the support F and gears with a screw $g$ formed on a shaft G which is journaled in bearings $G^1$ $G^2$ carried by the side plate A. On the shaft G is fixed a bevel pinion H gearing with a toothed wheel I fixed on a shaft J which is one of the elements of the connecting mechanisms between the gear for transmitting the motion for actuating the sighting apparatus and the apparatus for indicating the elevations. This shaft J may with advantage be journaled inside the shaft K that carries the pinion or pinions L that actuate the apparatus for elevating the gun barrel. The shaft J may be actuated by means of a handwheel M fixed to the wheel I. The apparatus for indicating the elevations is mounted on the end of the shaft J that is farthest from the toothed wheel I. The said apparatus comprises a graduated disk N that is loose on the shaft J and carries on axle pins $n$, satellite wheels O gearing with a pinion $j$ fixed on the shaft J. At their other sides the satellite wheels O gear with a ring of teeth $k$ formed on a disk fixed on the shaft K. The actuation of the shaft K and consequently of the pinions L for moving the elevating sectors P, is effected for instance by a helical wheel Q which is fixed on the said shaft and gears with a worm R that is actuated by means of a handwheel $r$ and is journaled in bearings carried by the side plate $A^1$.

The apparatus for indicating the elevations comprises a fixed pointer S projecting from the side plate $A^1$ and a hand-operated pointer as for instance a pointer T whose hub is loose on the hub of the disk N. The pointer T carries a fixing and operating device such as a spring catch $t$ whose head is adapted to engage with teeth U on the disk N arranged in a circle that is coaxial to the latter.

The operations to be performed for the purpose of giving the required firing elevation to the gun are the following:—

In the case of firing by direct aim, the left hand gun server operates the handwheel M to so actuate the gearing I—H—G—$g$—$f$, as to bring the line of sight of the apparatus E on to the target. This operation does not affect the gun barrel in any way. The shaft J however is moved by the movements of the handwheel M and produces by the movement of the pinion $j$, a corresponding movement of the satellite wheels O and the disk N that carries these. The ratios of the numbers of teeth of the wheels $j$ and O and the wheels I and H are such that the elevation disk N will be shifted relatively to the fixed pointer S through an angle equal to the angle through which the sighting apparatus E has been rotated. The consequence is that the zero mark of the disk N which was opposite the pointer S when the line of sight was horizontal, will always be shifted in proportion to the given site angle.

The right hand gun server, on his side, before producing the elevation, that is to say, before moving the gun barrel, first brings the pointer T opposite the division of the disk N that corresponds to the range of the target. He has subsequently merely to actuate the handwheel $r$ in such a manner as to bring the pointer T opposite the fixed pointer S. The actuation of the handwheel $r$ imparts motion by means of the worm R to the helical wheel Q, the shaft K with the pinions L and the sectors P. At the same time the ring of teeth $k$, is driven and through these, the satellite wheels O are caused to revolve around the pinion $j$. The axle pins $n$ of these satellites carry the elevation disk N around with them together with the pointer T that is fixed to the said disk.

The gun server will thus have shifted the gun barrel through an angle that is equal to the algebraic sum of the elevation and the site.

Where the site is equal to zero then the angle through which the selected elevation division has been shifted will be exactly proportional to the selected elevation.

If on the contrary the selected elevation division has been shifted by the left hand gun server through an angle that is equal to the positive or negative site, then in order to bring the said division back opposite to the fixed pointer S, the right hand gun server will have to rotate the disk N and consequently the gun barrel through an angle that is equal to the algebraic sum of the elevation and the site.

In a case where the firing is to be indirect, the site angle of the target is given to the left hand gun server who actuates the level $e$ in the known way, by moving the latter through an angle that corresponds to the given site. The same gun server then operates the handwheel M until he has returned the air bubble of the spirit level $e$ between its register marks. In this operation he moves the elevation disk N, the zero mark of which he shifts through an angle proportional to the site angle.

In the modification shown in Figs. 6 and 7, the satellites O are mounted on a disk V that is loose on the shaft J and fixed to a pointer W which is movable in front of an elevation disk N attached to the side plate $A^1$ of the gun carriage. T is a pointer carried by a socket $t^1$ which is movable in a guide $n^1$ formed on the periphery of the box $N^1$ that carries the disk N. $t$ is a spring catch adapted to be engaged with the teeth U of the box $N^1$, opposite any desired division of the disk N.

It will be readily understood that the left hand gun server, in operating the handwheel M, moves the pointer W which will be shifted through an angle that is proportional to the site angle given to the said gun server.

In order to give the selected elevation the right hand gun server brings the pointer T opposite the division of the elevation disk N that corresponds to the selected range. He then operates the handwheel $r$ in such a manner as to bring the pointer W opposite the pointer T.

If the site is equal to zero, the displacement thus given to the pointer W will correspond exactly to the selected elevation. If on the contrary the pointer W has been shifted by the left hand gun server, through an angle equal to the site, the displacement given to the gun barrel by the right hand gun server, will be equal to the algebraic sum of the elevation and the site.

The gear for transmitting the motion for actuating the sighting apparatus, is according to this invention, entirely independent of the gun barrel, and thus has merely to shift only the sighting apparatus and one of the elements (graduated disk or pointer) of an apparatus for indicating the elevations. This gear therefore may be made very flexible and of considerably less strength than in known arrangements where it has to move the gun cradle and the gun barrel as well as the sighting apparatus.

Figure 8:
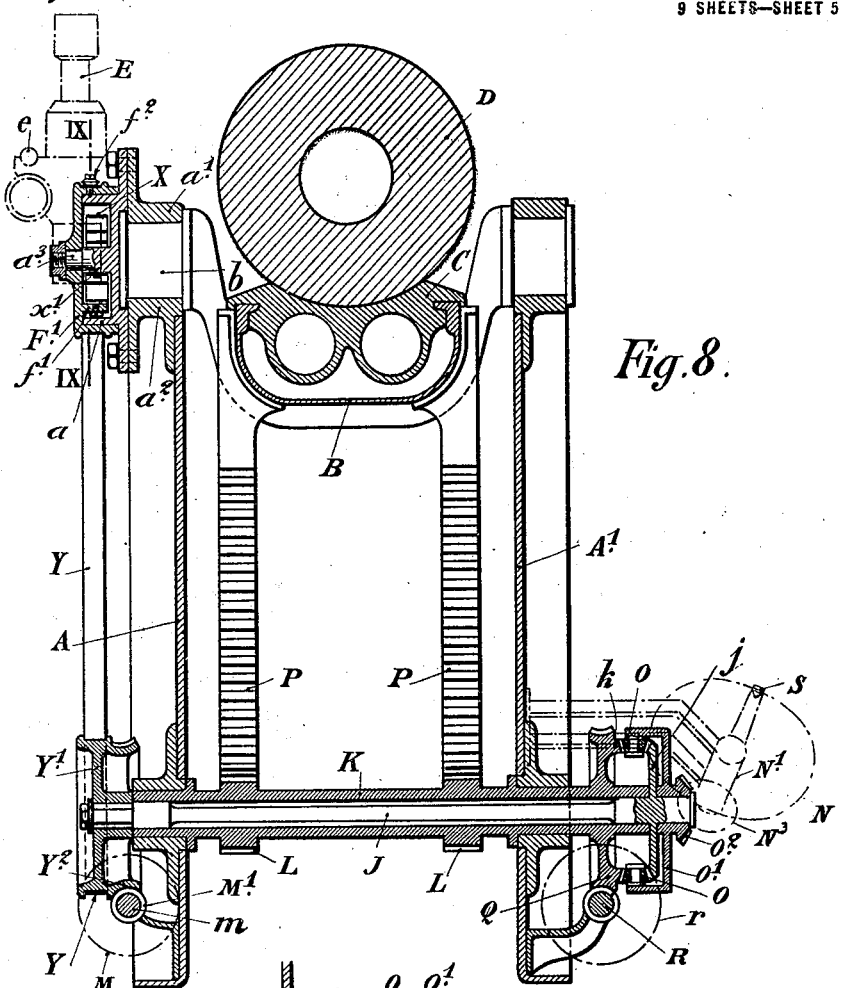
Fig. 8 is a cross section on the line VIII—VIII of Fig. 9.
Figure 10:
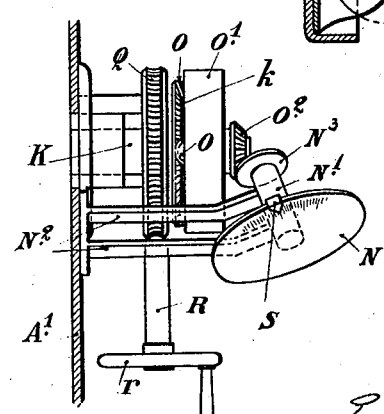
Fig. 10 is a plan illustrating the manner of mounting the apparatus for reading the elevations on the side plate A' of the gun carriage.

The constructional example illustrated in Figs. 8, 9 and 10, comprises a particularly simple and practical gearing for actuating the sighting apparatus and one of the elements of the apparatus for indicating the elevation.

In the example illustrated in Figs. 8–10, the support F for the sighting apparatus E is fixed to a kind of cylindrical box cover $F^1$ fitted on a box $a$ which is fixed on the cap square $a^1$ and trunnion plate $a^2$ of the cradle trunnion $b$. The box cover $F^1$ is loose on an axle pin $a^3$ fixed to the box $a$. The said cover has an inner projection $f^1$ serving as a means of attachment to the outer end $x$ of a spiral spring X whose inner end $x^1$ is attached to the axle pin $a^3$. The spring X has a suitable initial tension and has thus a constant tendency to rotate the cover $F^1$ and consequently the combination $F^1$—F—E in the direction of the arrow 1, (Fig. 9). Externally the cover $F^1$ carries a means of attachment such as a screw $f^2$ for one end $y$ of a metal band Y which is coiled around the said cover, and whose other end is coiled around and attached at $y^1$ to a pulley $Y^1$ fixed to a helical wheel $Y^2$ keyed on the shaft J that actuates one of the elements of the apparatus for indicating the elevation.

The simultaneous actuation of the shaft J and support F of the sighting apparatus is effected by the operation of a handwheel M fixed on the shaft $m$ of a worm $M^1$ journaled in the side plate of the gun carriage and gearing with the helical wheel $Y^2$. The shifting of the sighting apparatus due to the operation of the handwheel M in one direction is effected by pulling the band Y in the direction of the arrow 2. The operation of the handwheel M in the opposite direction tends to slack the band, but the spiral spring X has a tendency to wind up the band with the result that the cover $F^1$ and consequently also the combination $F^1$—F—E is moved in the direction of the arrow 3.

This particular form of gearing reduces considerably the number of toothed elements and the unavoidable backlash connected with the use of such elements, which backlash can be taken up only by complicated additional devices. It is to be understood that this very light gearing can only be employed owing to the complete independence between the mechanism for actuating the sighting apparatus and the mechanism for operating the gun barrel.

This constructional example of Figs. 8, 9, and 10, shows also a modification in the construction of the apparatus for reading the elevation. In this modification the movable disk N and the fixed pointer S, instead of being parallel to the side plate A¹, are arranged in a plane and at an inclination that will facilitate the elevation readings by the gun-server who is charged with the operation of the handwheel $r$ which latter remains in a plane at right angles to the longitudinal axial plane of the gun barrel. The inclined disk N is mounted on a shaft N¹ journaled in a bracket N² fixed to the side plate A¹. The shaft N¹ has fixed on it a bevel pinion N³ gearing with a pinion O² fixed to the casing O¹ that serves as the support for the axle pins of the bevel satellite wheels O. The latter gear with the ring of teeth $k$ fixed to the helical wheel Q that gears in its turn with a worm R.

The disk N is not shown in detail because its construction is the same as in the preceding examples. The movable pointer T is also not shown, nor is the means for fixing the latter to the disk.

In the hereinbefore described examples the support for the sighting apparatus is assumed to be mounted around the axis of one of the cradle trunnions, and the shaft J for actuating the movable element of the apparatus for indicating the elevation is assumed to be mounted inside the shaft K that carries the pinions L for actuating the elevating sectors P.

Figure 11:
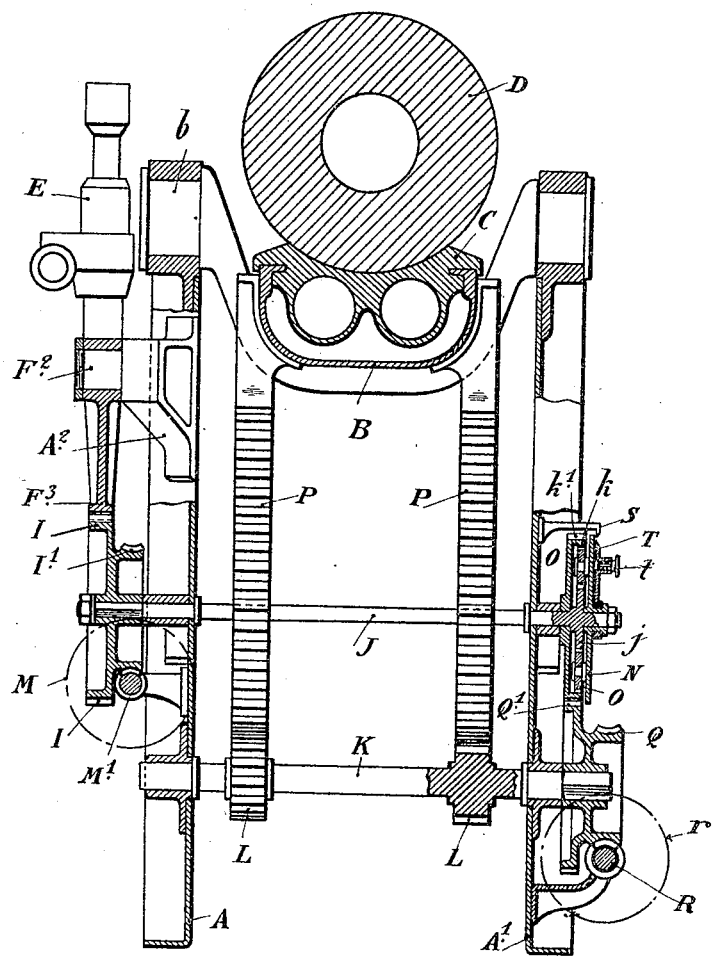

In the modification illustrated in Figs. 11, 12 and 13, the support F for the sighting apparatus is movable around an axle pin F² carried by a bracket A² affixed to the side plate A. On the axle pin F² there is fixed a toothed sector F³ gearing with a toothed wheel I fixed to a helical wheel I¹ and keyed on the shaft J which in this example is parallel to the shaft K. By means of a handwheel M fixed on the shaft of a worm M¹ journaled in the side plate A, the wheel I¹ may be operated to produce the movements of the sighting apparatus as well as those of the shaft J which carries the movable element N of the apparatus for reading the elevation.

The elevation mechanism comprises a handwheel $r$ for actuating a worm R journaled in bearings carried by the side plate A¹ and gearing with a helical wheel Q fixed to a toothed wheel Q¹ that gears in its turn with the toothed wheel $k^1$ loose on the shaft J. This toothed wheel $k^1$ is provided also with internal teeth $k$ that gear, as in the examples shown in Figs. 1 to 5, with the satellite wheels O that rotate on axle pins carried by the elevation disk N.

What I claim is:—

1. In aiming apparatus for guns, the combination of a sighting device operable independently of the gun barrel, and means for operating said device, elevation indicating means including a stationary element and a movable element having operative connection with said sight operating means to follow the angular displacements of the sighting device, and gun elevating means having connections with said movable element to move the latter independently of the sighting device through an angle equal the algebraic sum of the elevation and sight angles.

2. In aiming apparatus for guns, the combination of a sighting device operable independently of the gun barrel, a shaft provided with a pinion and having connections with said sighting device for operating the same, an elevation indicating device including a fixed element and a movable element loosely mounted on said shaft, satellite gear wheels meshing with said pinion for angularly displacing said movable element through an angle equal to the inclination given the sighting device and a gun elevating shaft provided with a gear wheel operably connected with said satellite gears for displacing said movable element through an angle equal the algebraic sum of the elevation and the sight angles.

3. In aiming apparatus for guns, the combination of a sighting device operable independently of the gun barrel, concentric shafts, the inner shaft having connections with said sighting device to operate the same and being provided with a pinion, the outer shaft having connection with gun elevating sectors and provided with manual means for operating the same, an elevation indicating device including a fixed element and a movable element loosely mounted on said inner shaft, satellite gear wheels meshing with said pinion for angularly displacing said movable element through an angle equal to the inclination given the sighting device and a gear wheel on said gun elevating shaft for displacing said movable element through an angle equal the algebraic sum of the elevation and sight angles.

4. In aiming apparatus for guns, the combination of a sighting device operable independently of the gun barrel, a shaft provided with a pinion and having connections with said sighting device for operating the same; an elevation indicating device including, a fixed element, a graduated disk loosely mounted on said shaft and having an adjustable index; satellite gear wheels meshing with said pinion for angularly displacing said disk through an angle equal to the inclination given the sighting device and a gun elevating shaft provided with a gear wheel meshing with said satellite wheels for displacing said disk through an angle equal the algebraic sum of the elevation and sight angles.

5. In aiming apparatus for guns, the combination of a sighting device mounted on a stationary part of the gun, a shaft provided at one end with manually operated gear connections with said sighting device and at the opposite end with a pinion, a gun elevating shaft surrounding the first-named shaft; an elevation indicating device including, a stationary element, a graduated disk loosely mounted on the first-named shaft and provided with a spring pressed hand movable over the face of the disk, and satellite wheels meshing with said pinion; a gear wheel on said gun elevating shaft meshing with said satellite wheels and manual means for operating said gun elevating shaft.

In testimony whereof I have signed this specification.

EUGÈNE SCHNEIDER.